US012630704B2

(12) United States Patent
Abe

(10) Patent No.: US 12,630,704 B2
(45) Date of Patent: May 19, 2026

(54) POLYPROPYLENE-BASED GRAFT POLYMER, THERMOPLASTIC RESIN COMPOSITION, AND MOLDED ARTICLE THEREOF

(71) Applicant: TECHNO-UMG CO., LTD., Tokyo (JP)

(72) Inventor: Fumiaki Abe, Tokyo (JP)

(73) Assignee: TECHNO-UMG CO., LTD., Tokyo (JP)

( * ) Notice: Subject to any disclaimer, the term of this patent is extended or adjusted under 35 U.S.C. 154(b) by 460 days.

(21) Appl. No.: 18/034,789

(22) PCT Filed: Dec. 1, 2021

(86) PCT No.: PCT/JP2021/044077
§ 371 (c)(1),
(2) Date: May 1, 2023

(87) PCT Pub. No.: WO2022/138030
PCT Pub. Date: Jun. 30, 2022

(65) Prior Publication Data
US 2023/0407078 A1      Dec. 21, 2023

(30) Foreign Application Priority Data

Dec. 23, 2020 (JP) ................................. 2020-213849
Feb. 1, 2021 (JP) ................................. 2021-014482
Oct. 19, 2021 (JP) ................................. 2021-171064

(51) Int. Cl.
| | |
|---|---|
| *C08L 23/12* | (2006.01) |
| *C08F 212/08* | (2006.01) |
| *C08F 220/44* | (2006.01) |
| *C08J 3/12* | (2006.01) |
| *C08L 23/26* | (2025.01) |
| *C08L 51/06* | (2006.01) |

(52) U.S. Cl.
CPC ............ *C08L 51/06* (2013.01); *C08F 212/08* (2013.01); *C08F 220/44* (2013.01); *C08J 3/12* (2013.01); *C08L 23/12* (2013.01); *C08L 23/26* (2013.01); *C08L 2203/30* (2013.01)

(58) Field of Classification Search
CPC ......... C08L 51/06; C08L 23/12; C08L 23/26; C08F 212/08; C08F 220/44; C08J 3/12
USPC ......................................... 524/64
See application file for complete search history.

(56) References Cited

U.S. PATENT DOCUMENTS

| | | | |
|---|---|---|---|
| 2014/0213729 A1 | 7/2014 | Hongo | |
| 2016/0111792 A1* | 4/2016 | Katayama | ................ H01Q 1/40 524/495 |
| 2019/0106575 A1 | 4/2019 | Harada et al. | |
| 2019/0202999 A1 | 7/2019 | Chen et al. | |
| 2020/0262958 A1 | 8/2020 | Takahashi et al. | |

FOREIGN PATENT DOCUMENTS

| | | | | |
|---|---|---|---|---|
| JP | H06-279545 A | 10/1994 | | |
| JP | H08-060076 A | 3/1996 | | |
| JP | 2006-045467 A | 2/2006 | | |
| JP | 2011-058008 A | 3/2011 | | |
| JP | 2012224670 A | * | 11/2012 | |
| JP | 2016-121334 A | 7/2016 | | |
| JP | 2019-137781 A | 8/2019 | | |
| JP | 2019-167534 A | 10/2019 | | |
| JP | 2019-532137 A | 11/2019 | | |
| KR | 20160004108 A | 1/2016 | | |
| TW | 201434940 A | 9/2014 | | |
| WO | 2017/104714 A1 | 6/2017 | | |
| WO | 2017/213250 A1 | 12/2017 | | |
| WO | WO-2019212020 A1 | * | 11/2019 | ........... G01S 13/931 |

OTHER PUBLICATIONS

Notice of Reasons for Refusal for Japanese Application No. 2020-213849 mailed on Nov. 5, 2024; 10 pp.
Taiwan Patent Office, Notice of Examination Opinion and Search Report for Taiwanese Patent Application No. 110146506 dated Apr. 15, 2025; 22 pp.
Extended European Search Report for European Application No. 21910182.1 dated Dec. 3, 2024; 7 pp.
PCT/ISA/210, "International Search Report for PCT International Application No. PCT/JP2021/044077," Feb. 22, 2022.

* cited by examiner

*Primary Examiner* — Deve V Hall
(74) *Attorney, Agent, or Firm* — HAUPTMAN HAM, LLP

(57) ABSTRACT

A polypropylene-based graft polymer is prepared by graft polymerization of a vinyl monomer onto polypropylene-based resin particles containing 100 parts by mass of a polypropylene resin and 5 to 25 parts by mass of an acid-modified olefin resin and having a volume-average particle size of 50 to 850 nm. A thermoplastic resin composition includes the polypropylene-based graft polymer. A molded article is obtained by molding the thermoplastic resin composition.

14 Claims, 1 Drawing Sheet

POLYPROPYLENE-BASED GRAFT POLYMER, THERMOPLASTIC RESIN COMPOSITION, AND MOLDED ARTICLE THEREOF

TECHNICAL FIELD

The present invention relates to a polypropylene-based graft polymer, a thermoplastic resin composition containing the polypropylene-based graft polymer, and a molded article thereof.

The present invention also relates to a thermoplastic resin composition capable of providing a molded article that has excellent appearance and that also stably exhibits millimeter-wave characteristics in a high region while the mechanical properties, such as impact resistance, inherent in a thermoplastic resin are maintained or improved, a molded article thereof, and a millimeter-wave radome and a millimeter-wave radar including the molded article.

BACKGROUND ART

Polypropylene has excellent performance but is not compatible with other resins. For this reason, various studies have been conducted on compatibilizers with other resins and modification of polypropylene itself, as disclosed, for example, in the following Patent Literatures 1 to 3.

Patent Literature 1 discloses an aromatic random copolymer prepared by polymerizing an aromatic vinyl compound, a vinyl cyanide compound, and an aromatic vinyl compound having a specific functional group, and discloses that this copolymer is also useful as a modifier for another resin or as a compatibilizer for a polymer alloy of a styrenic resin, such as ABS, and a resin selected from polyolefins.

Patent Literature 2 discloses a polypropylene resin composition for coating, the polypropylene-based resin composition being a mixture of a modified propylene-based polymer prepared by subjecting an α, β-unsaturated carboxylate having a hydroxy group and an aromatic vinyl compound to a graft copolymerization process, and a propylene polymer having a polar group selected from a hydroxy group, a carboxy group, an acid anhydride group, an epoxy group, and an amino group, the propylene polymer being different from the foregoing modified propylene polymer, and discloses that the polypropylene-based resin composition has excellent coating adhesion and high mechanical strength without requiring application of a primer and/or cleaning with an organic solvent, such as trichloroethane, at the time of coating.

Patent Literature 3 discloses styrene-modified polypropylene-based resin particles prepared by polymerizing styrene using polypropylene-based resin particles as nuclei, and discloses that the styrene-modified polypropylene-based resin particles can provide an expanded styrene-modified polypropylene-based resin molded article excellent in, for example, mechanical properties and chemical resistance.

As described above, various reports have been made on the modification of polypropylene and compatibilizers with other resins. The techniques described in Patent Literatures 1 and 2 are still insufficient, although they are effective to some extent in improving impact strength and coatability as a compatibilizer or a modifier.

In the technique described in Patent Literature 3, polymerization is performed after the impregnation of the polypropylene-based resin particles with styrene. However, since the polypropylene-based resin particles are impregnated with styrene, the resulting particles do not have sufficient strength and are not sufficiently useful as a compatibilizer.

In particular, in the conventional art, sufficiently satisfactory results are not obtained with regard to, for example, the modification effect or, as a compatibilizer, the adhesion between a polypropylene-based resin and a thermoplastic resin in two-color molding.

In recent years, wireless communications, sensors, and so forth provided with millimeter-wave radars, which transmit and receive millimeter waves, have been actively developed, and application examples thereof have also been widely reported. Some of them have already been put into practical use, such as a sensor for instantaneously detecting the position and speed of a moving person or object, and an imaging device for security check.

Millimeter-wave radars typically include antenna modules that transmit or receive millimeter waves and radomes (antenna covers) that house or protect antenna modules. Radomes are typically formed of resin molded articles and have various shapes in accordance with applications. Examples of radomes include a radome in which the entire radome is formed of a material that easily transmits radio waves, and a radome in which only a specific portion corresponding to a path of radio waves is formed of a material that easily transmits radio waves.

Various studies have been conducted in the past on millimeter-wave-transparent molding materials that constitute radomes for millimeter waves, and have been reported in, for example, Patent Literature 4 and Patent Literature 5.

Patent Literature 4 discloses a millimeter-wave-transparent resin component composed of a thermoplastic resin composition containing a rubbery polymer-reinforced vinyl resin having a polymer portion derived from an ethylene-α-olefin rubber having a specific ethylene unit content and a vinyl resin portion.

The molding material described in Patent Literature 4, however, has millimeter-wave characteristics to some extent, but the millimeter-wave characteristics are still insufficient.

Patent Literature 5 discloses a resin component in which a polypropylene-based graft polymer (PP-g-AS) is blended with an AES resin and a polycarbonate resin and which is disposed in a path of a beam emitted from a radar device.

In Patent Literature 5, the incorporation of the PP-g-AS polymer further improves millimeter-wave characteristics.

However, the stability of the millimeter-wave characteristics is not sufficient. For this reason, when the resin component is used for a high-dimensional radar device, a large number of defective products may be produced due to large variations in millimeter-wave characteristics.

The failure as a radar device leads to safety concern. In addition to the fact that a defective product wastes manufacturing energy, variations in performance as a radar may compromise safety.

PTL 1: JP H6-279545 A
PTL 2: JP H8-60076 A
PTL 3: JP 2011-58008 A
PTL 4: JP 2016-121334 A
PTL 5: WO 2017/104714 A1

SUMMARY OF INVENTION

It is an object of the present invention to provide a polypropylene-based graft polymer and a thermoplastic resin composition capable of providing a thermoplastic resin molded article with excellent appearance while the mechanical properties, such as impact resistance, inherent in a thermoplastic resin are maintained or improved, and capable of providing an excellent two-color molded article having high adhesion strength in two-color molding with a polypropylene-based resin, and a molded article thereof.

The inventors have found that the above problems can be solved by using a polypropylene-based graft polymer (E) prepared by graft polymerization of a vinyl monomer (D1) onto polypropylene-based resin particles (C) that have a specific particle size and that contain a polypropylene resin (A) and an acid-modified olefin resin (B) at a predetermined ratio.

It is another object of the present invention to provide a thermoplastic resin composition capable of providing a molded article that has excellent appearance and that also stably exhibits millimeter-wave characteristics in a high region while the mechanical properties, such as impact resistance, inherent in a thermoplastic resin are maintained or improved, and a molded article thereof.

The inventors have found that the above problems can be solved by mixing, at a predetermined ratio, the polypropylene-based graft polymer (E) and a graft polymer (G) prepared by graft polymerization of a vinyl monomer (D2) onto an ethylene-α-olefin-based rubber polymer (F) having an ethylene unit content of 50% to 95% by mass.

[1] A polypropylene-based graft polymer (E) prepared by graft polymerization of a vinyl monomer (D1) onto polypropylene-based resin particles (C) containing 100 parts by mass of a polypropylene resin ([ ] A) and 5 to 25 parts by mass of an acid-modified olefin resin (B) and having a volume-average particle size of 50 to 850 nm.

[2] The polypropylene-based graft polymer (E) according to [1], wherein the polypropylene-based graft polymer (E) has a degree of grafting of 10% to 70% by mass.

[3] The polypropylene-based graft polymer (E) according to [1] or [2], wherein of 100% by mass of the vinyl monomer (D1), 50% to 90% by mass is an aromatic vinyl compound, and 10% to 50% by mass is a vinyl cyanide compound.

[4] The polypropylene-based graft polymer (E) according to any one of [1] to [3], wherein the polypropylene-based graft polymer (E) is prepared by graft polymerization of 20% to 70% by mass of the vinyl monomer (D1) in the presence of 30% to 80% by mass of the polypropylene-based resin particles (C) (provided that the total of the polypropylene-based resin particles (C) and the vinyl monomer (D1) is 100% by mass).

[5] The polypropylene-based graft polymer (E) according to any one of [1] to [4], wherein the polypropylene-based resin particles (C) are prepared by melt-kneading the polypropylene resin ([ ] A) and the acid-modified olefin resin (B) and dispersing a resultant kneaded product in an aqueous medium.

[6] A thermoplastic resin composition, comprising the polypropylene-based graft polymer (E) according to any one of [1] to [5].

[7] The thermoplastic resin composition according to [6], wherein the amount of the polypropylene-based graft polymer (E) contained is 3% to 70% by mass based on 100% by mass of all resin components contained in the thermoplastic resin composition.

[8] A thermoplastic resin composition, comprising:
1 to 80 parts by mass of the polypropylene-based graft polymer (E) according to any one of [1] to [5]; and
20 to 99 parts by mass of a graft polymer (G) prepared by graft polymerization of a vinyl monomer (D2) onto an ethylene-α-olefin rubber polymer (F) having an ethylene unit content of 50% to 95% by mass (provided that a total of the polypropylene-based graft polymer (E) and the graft polymer (G) is 100 parts by mass).

[9] The thermoplastic resin composition according to [8], wherein of 100% by mass of the vinyl monomer (D2), 50% to 90% by mass is an aromatic vinyl compound, and 10% to 50% by mass is a vinyl cyanide compound.

[10] The thermoplastic resin composition according to [8] or [9], wherein the graft polymer (G) is a rubbery polymer-reinforced vinyl resin having a grafted polymer portion and a vinyl resin portion, the grafted polymer portion being derived from the ethylene-α-olefin rubber polymer (F) and the vinyl monomer (D2), the grafted polymer portion is contained in an amount of 10% to 90% by mass, and the vinyl resin portion is contained in an amount of 90% to 10% by mass, based on 100% by mass of a total of the grafted polymer portion and the vinyl resin portion, and a degree of grafting is 20% to 65%.

[11] A molded article obtained by molding the thermoplastic resin composition according to any one of [6] to.

[12] A millimeter-wave radome, comprising the molded article according to [11].

[13] A millimeter-wave radar, comprising the millimeter-wave radome according to [12].

[14] A two-color molded article obtained by two-color molding of the thermoplastic resin composition according to any one of [6] to and a polypropylene-based resin.

Advantageous Effects of Invention

The polypropylene-based graft polymer (E) of the present invention has excellent production stability and also has excellent dispersibility in a thermoplastic resin because the polypropylene-based graft polymer (E) has a relatively small particle size in an emulsified state.

The thermoplastic resin composition containing the polypropylene-based graft polymer (E) of the present invention can be used to provide a thermoplastic resin-molded article having excellent appearance while the mechanical properties, such as impact resistance, are maintained or improved, and can be effectively used in a wide range of applications including products and components, such as vehicle interior and exterior components, in which the polypropylene-based resin is used.

Furthermore, the thermoplastic resin composition containing the polypropylene-based graft polymer (E) of the present invention can be subjected to two-color molding with a polypropylene-based resin to provide an excellent two-color molded article having high adhesion strength. Thus, a high-quality product can be efficiently produced without the need for a bonding process or the like.

The thermoplastic resin composition, of the present invention, containing the polypropylene-based graft polymer (E) of the present invention and the specific graft polymer (G) can be used to provide a thermoplastic resin-molded article having excellent appearance and also stably exhibiting millimeter-wave characteristics in a high region while the mechanical properties, such as impact resistance, inherent in a thermoplastic resin are maintained or improved.

The thermoplastic resin molded article containing the thermoplastic resin composition of the present invention can be used to provide the millimeter-wave radome and the millimeter-wave radar that are excellent in mechanical properties, such as impact resistance, appearance, and so forth, that are also excellent in millimeter-wave characteristics and their stability, and that have high quality and high reliability.

DESCRIPTION OF EMBODIMENTS

Figure 1A:
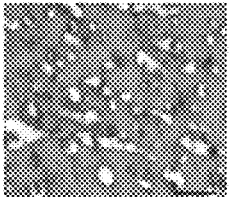
FIG. 1A is a TEM image obtained from a thin film prepared from a sample cut from the molded article of Example II-1.
Figure 1B:
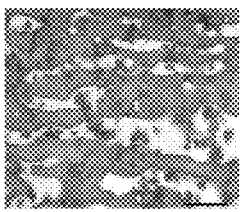
FIG. 1B is a TEM image obtained from a thin film prepared from a sample cut from the molded article of Example II-2.
Figure 1C:
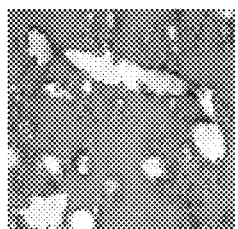
FIG. 1C is a TEM image obtained from a thin film prepared from a sample cut from the molded article of Comparative Example II-1.
Figure 1D:
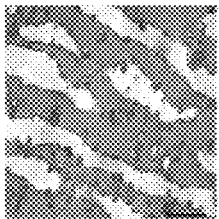
FIG. 1D is a TEM image obtained from a thin film prepared from a sample cut from the molded article of Comparative Example II-2.

Embodiments of the present invention will be described in detail below.

[Polypropylene-Based Graft Polymer (E)]

A polypropylene-based graft polymer (E) of the present invention is prepared by graft polymerization of a vinyl monomer (D1) onto polypropylene-based resin particles (C) containing 100 parts by mass of a polypropylene resin (A) and 5 to 25 parts by mass of an acid-modified olefin resin (B) and having a volume-average particle size of 50 to 850 nm. According to the polypropylene-based graft polymer (E) of the present invention, a thermoplastic resin molded article excellent in impact resistance and appearance can be produced. Moreover, a thermoplastic resin composition containing the polypropylene-based graft polymer (E) is also suitable as a material for two-color molding with a polypropylene-based resin.

<Polypropylene Resin (A)>

The polypropylene resin (A) only needs to have, as a main component, 50% or more by mole, preferably 80% to 100% by mole of propylene units based on the total constitutional units. Examples thereof include a homopolymer obtained by homopolymerization of propylene; a random copolymer obtained by copolymerization of propylene with a copolymerizable component, such as an α-olefin, e.g., ethylene or 1-butene; and a block copolymer obtained by homopolymerization of propylene and then copolymerization of propylene with a copolymerizable component, such as an α-olefin, e.g., ethylene or 1-butene. Any of these can be used.

As the polypropylene resin (A) of the homopolymer, a commercially available product can be used. Examples of the commercially available product include product names: Prime Polypro J105G, Prime Polypro J106G, Prime Polypro J106 MG, Prime Polypro J108M, and Prime Polypro J-700GP, available from Prime Polymer Co., Ltd.; and product names: Noblen FS2011DG3, Noblen WF836DG3, Noblen D101, Noblen W101, and Noblen Z101A, available from Sumitomo Chemical Co., Ltd.

As the polypropylene resin (A) of the random copolymer, a commercially available product can be used. Examples of the commercially available product include product names: Prime Polypro J226T, Prime Polypro J229E, Prime Polypro J-721GR, Prime Polypro J-2021GR, Prime Polypro J-2023GR, Prime Polypro J-2041GA, and Prime Polypro J-3021GR, available from Prime Polymer Co., Ltd.; and product names: Noblen FL6632G, Noblen FL6737, and Noblen S131, available from Sumitomo Chemical Co., Ltd.

As the polypropylene resin (A) of the block copolymer, a commercially available product can be used. Examples of the commercially available product include product names: Prime Polypro BJS-MU, Prime Polypro J704 LB, Prime Polypro J704UG, Prime Polypro U705UG, Prime Polypro J715m, Prime Polypro J707G, Prime Polypro J707EG, Prime Polypro J830HV, Prime Polypro J708UG, and Prime Polypro J7090G, available from Prime Polymer Co., Ltd.; and product names: Noblen AD571, Noblen AW564, and Noblen AZ564, available from Sumitomo Chemical Co., Ltd.

The degree of polymerization (molecular weight) of the polypropylene resin (A) is not particularly limited. The melt mass-flow rate (hereinafter, also referred to as an "MFR") measured at a measurement temperature of 230° C. and a load of 50 N according to JIS K7210' is preferably 40 to 70 g/10 minutes, more preferably 45 to 65 g/10 minutes. When the MER is within this range, a more stable emulsified state can be achieved during the production of the polypropylene-based resin particles (C). When the MFR is out of this range, the formation of emulsion tends to be insufficient, and the time the emulsified state remains stable tends to be short.

As the polypropylene resin (A), only a single type may be used, or a mixture of two or more types different in physical properties, the type of copolymer component, the copolymer composition, and so forth may be used.

The polypropylene resin (A) can be selected according to the purpose. In the production of the polypropylene-based graft polymer (E) of the present invention, it is preferable to use a random copolymer, particularly a propylene-ethylene random copolymer or a propylene-1-butene random copolymer, from the viewpoint of emulsion stability.

<Acid-Modified Olefin Resin (B)>

The acid-modified polyolefin resin (B) is obtained by acid modification of a polyolefin resin that is a polymer or copolymer of one or two or more olefins, such as ethylene, propylene, 1-butene, 2-butene, isobutene, 1-pentene, 2-pentene, cyclopentene, 1-hexene, 2-hexene, cyclohexene, 1-heptene, 2-heptene, cycloheptene, 1-octene, 2-octene, cyclooctene, vinylcyclopentene, vinylcyclohexene, vinylcycloheptene, and vinylcyclooctene. As the polyolefin resin, only one of them may be used, or two or more of them may be used. Among these, polypropylene is particularly preferably used.

The modifying group introduced by acid modification of the polyolefin resin is preferably a sulfo group, a carboxyl group, a phosphate group, a hydroxy group, or a thiol group, or the like, particularly preferably a carboxy group.

The acid-modified olefin resin (B) having a carboxy group introduced as an acid modification group can be obtained by modifying a polyolefin resin with a saturated or unsaturated carboxylic acid having a carboxy group or an acid anhydride group-containing compound thereof.

Examples of saturated or unsaturated carboxylic acid having a carboxy group include formic acid, acetic acid, propionic acid, acrylic acid, methacrylic acid, oxalic acid, malonic acid, succinic acid, maleic acid, fumaric acid, phthalic acid, and terephthalic acid. Examples of acid anhydride group-containing compound include maleic anhydride, acetic anhydride, propionic anhydride, succinic anhydride, and phthalic anhydride. These may be used alone, or two or more thereof may be used.

The acid value of the acid-modified polyolefin resin (B) is preferably 1 to 60 mgKOH/g, more preferably 5 to 50 mgKOH/g. An acid value of 1 mgKOH/g or more results in good stability in an emulsified state. An acid value of 60 mgKOH/g or less easily leads to excellent compatibility.

From the same perspective, for example, in the case of a maleic anhydride-modified polyolefin resin, the amount of maleic anhydride grafted is preferably 1% to 20% by mass, more preferably 1% to 10% by mass. When the amount of maleic anhydride grafted is 1% or more by mass, the stability in the emulsified state is good. When the amount of maleic anhydride grafted is 20% or less by mass, excellent compatibility is easily obtained.

As the acid-modified polyolefin resin (B), a commercially available product can be used. Examples of the commercially available acid-modified polyolefin resin (B) include Umex 1001 (product name, available from Sanyo Chemical Industries, Ltd.); and Hiwax NP0555A and Hiwax NP50605A (product names, available from Mitsui Chemicals, Inc).

As the acid-modified polyolefin resin (B), only a single type may be used, or a mixture of two or more types different in the type and amount of acid modification group introduced, the acid value, the type of polyolefin resin, and so forth may be used.

The acid-modified polyolefin resin (B) is used in an amount of 5 to 25 parts by mass based on 100 parts by mass of the polypropylene resin (A). The amount mixed is preferably 7 to 22 parts by mass. When the acid-modified polyolefin resin (B) is contained in an amount of 5 to 25 parts by mass based on 100 parts by mass of the polypropylene resin (A), the emulsified state is stabilized. This makes it possible to reduce the influence on the characteristics when it is incorporated into a thermoplastic resin composition.

<Polypropylene-Based Resin Particles (C)>

The polypropylene-based resin particles (C) are obtained by emulsifying a polypropylene-based resin composition containing 100 parts by mass of the polypropylene resin (A) and 5 to 25 parts by mass, preferably 7 to 22 parts by mass, of the acid-modified olefin resin (B) in an aqueous medium in a state such that the volume-average particle size is in a specific range.

A method for preparing the polypropylene-based resin particles (C) is not particularly limited. Examples of the method for preparing the polypropylene-based resin particles (C) include the following methods (1) and (2).

(1) A method in which the polypropylene resin (A) and the acid-modified olefin resin (B) are dispersed by the application of a mechanical shear force using melt-kneading with a known melt-kneading means (such as a kneader, a Banbury mixer, or a multi-screw extruder), and the resulting mixture is added to an aqueous medium containing an emulsifier.

(2) A method in which the polypropylene resin (A) and the acid-modified olefin resin (B) are dissolved in a hydrocarbon solvent (such as pentane, hexane, heptane, benzene, toluene, or xylene) together with an emulsifier, the resulting solution is added to an aqueous medium to prepare an emulsion, the resulting emulsion is sufficiently stirred, and the hydrocarbon solvent is removed by evaporation.

A method for producing the polypropylene-based resin particles (C) is preferably a method in which the polypropylene resin (A) and the acid-modified olefin resin (B) are dispersed by the application of a mechanical shear force using melt-kneading at a temperature of about 180° C. to about 240° C., and the resulting mixture is added to an aqueous medium containing an emulsifier, because this organic solvent-free production can avoid the odor of residual solvents and the health and environmental effects of volatile substances, and requires no special facility for removing organic solvent components during the production.

Examples of the emulsifier include known ones. Examples thereof include long-chain alkyl carboxylates, alkyl sulfosuccinates, and alkylbenzene sulfonates For example, when an anionic emulsifier, such as potassium oleate, is used as the emulsifier, the amount of emulsifier added is preferably 1 to 15 parts by mass based on 100 parts by mass of the polypropylene resin (A) because the thermal coloration of the resulting polypropylene-based resin particles (C) can be inhibited, and the particle size of the polypropylene-based resin particles (C) is easily controlled.

Preferably, the emulsifier is mixed in advance with the polypropylene resin (A) and the acid-modified olefin resin (B) before the melt kneading, from the viewpoints of an improvement in the dispersibility of the polypropylene-based resin particles (C) and the stability of the emulsified state.

At the time of the melt-kneading, an alkali, such as potassium hydroxide or sodium hydroxide, is added in the form of an aqueous solution. The addition of the aqueous alkali solution facilitates control of the volume-average particle size of the resulting polypropylene-based resin particles (C). The alkali is preferably added in the form of an aqueous solution having a concentration of about 5% to 20% by mass. The amount of alkali added varies in accordance with other conditions and a target volume-average particle size, and is preferably about 1 to about 10 parts by mass based on 100 parts by mass of the polypropylene resin (A).

The polypropylene resin (A) and the acid-modified olefin resin (B) are dispersed by the application of a mechanical shear force using melt-kneading to provide a kneaded product. After the resulting kneaded product is cooled to 60° C. to 120° C., the kneaded product is added to an aqueous medium and emulsified. As the aqueous medium, water is typically used. The temperature of the aqueous medium when the kneaded product is added is preferably 80° C. to 90° C. from the viewpoint of dispersibility.

The solid content concentration of the resulting aqueous dispersion of the polypropylene-based resin particles (C) (concentration of the polypropylene-based resin particles (C)) is preferably about 20% to about 60% by mass from the viewpoint of, for example, handleability during the subsequent graft polymerization reaction, productivity, and long-term emulsion stability.

The polypropylene-based resin particles (C) has a volume-average particle size of 50 to 850 nm, preferably 150 to 750 nm, more preferably 250 to 650 nm, because of their excellent emulsion stability, excellent dispersibility in a thermoplastic resin, and excellent physical properties of the resulting molded article.

The volume-average particle size of the polypropylene-based resin particles (C) is a value measured by a method described in the section of Examples below.

Examples of a method for controlling the volume-average particle size of the polypropylene-based resin particles (C) include methods in which the type or amount of emulsifier added, the alkali addition in the melt-kneading, the shear force applied during kneading, temperature conditions, and the like are adjusted.

<Vinyl Monomer (D1)>

Examples of the vinyl monomer (D1) include aromatic vinyl compounds, vinyl cyanide compounds, (meth)acrylate compounds, maleimide compounds, unsaturated acid anhydrides, carboxy group-containing unsaturated compounds, amino group-containing unsaturated compounds, amide group-containing unsaturated compounds, hydroxy group-containing unsaturated compounds, and oxazoline group-containing unsaturated compounds. These compounds may be used alone or in combination of two or more.

The vinyl monomer (D1) preferably contains an aromatic vinyl compound. More preferably, the vinyl monomer (D1) is a monomer mixture further containing a vinyl cyanide compound.

Examples of the aromatic vinyl compound include styrene, α-methylstyrene, o-, m-, or p-methylstyrene, vinylxylene, p-tert-butylstyrene, and ethylstyrene. Styrene and α-methylstyrene are preferred from the viewpoints of the impact resistance and appearance of the resulting molded article. As the aromatic vinyl compound, a single type may be used alone, or two or more types may be used in combination.

Examples of the vinyl cyanide compound include acrylonitrile and methacrylonitrile. As the vinyl cyanide compound, a single type may be used alone, or two or more types may be used in combination.

The aromatic vinyl compound content is preferably 50% to 90% by mass, more preferably 60% to 85% by mass, even more preferably 70% to 80% by mass, based on 100% by mass of the vinyl monomer (D1). When the aromatic vinyl compound content is within the above range, the resulting molded article is more excellent in color developability, transparency, and impact resistance.

The vinyl cyanide compound content is preferably 10% to 50% by mass, more preferably 15% to 40% by mass, even more preferably 20% to 30% by mass, based on 100% by mass of the vinyl monomer (D1). When the vinyl cyanide compound content is within the above range, the impact resistance and appearance of the molded article are further improved.

As the vinyl monomer (D1), in addition to the aromatic vinyl compound and the vinyl cyanide compound, another monomer copolymerizable with these may be contained within a range that does not impair the effect of the present invention, for example, within a range of 30% or less by mass based on 100% by mass of the vinyl monomer (D1).

Examples of another monomer include (meth)acrylate compounds (such as methyl acrylate, ethyl acrylate, propyl acrylate, butyl acrylate, methyl methacrylate, ethyl methacrylate, propyl methacrylate, and butyl methacrylate) and maleimide compounds (such as n-cyclohexylmaleimide and N-phenylmaleimide). As another monomer, a single type may be used alone, or two or more types may be used in combination.

<Polypropylene-Based Graft Polymer (E)>

The polypropylene-based graft polymer (E) of the present invention is prepared by graft polymerization of the vinyl monomer (D1) in the presence of the polypropylene-based resin particles (C).

The polypropylene-based graft polymer (E) is preferably prepared by graft polymerization of 20% to 70% by mass of the vinyl monomer (D1) in the presence of 30% to 80% by mass of the polypropylene-based polymer particles (C) (provided that the total of the polypropylene-based resin particles (C) and the vinyl monomer (D1) is 100% by mass) from the viewpoint of excellent impact resistance and appearance of the resulting molded article.

The degree of grafting of the polypropylene-based graft polymer (E) is preferably 10% to 70% by mass, more preferably 15% to 60% by mass, even more preferably 20% to 50%, from the viewpoint of excellent impact resistance and appearance of the resulting molded article.

The degree of grafting is a value measured by a method described in the section of Examples below.

Examples of a graft polymerization method of the vinyl monomer (D1) onto the polypropylene-based resin particles (C) include known polymerization methods (such as an emulsion polymerization method, a solution polymerization method, a suspension polymerization method, a bulk polymerization method, and a combination thereof). The emulsion polymerization method is particularly preferred as a graft polymerization method because of its superior impact resistance and appearance of the resulting molded articles.

An example of a method for producing the polypropylene-based graft polymer (E) using the emulsion polymerization method is a method in which an organic peroxide is mixed with the vinyl monomer (D1), the vinyl monomer (D1) is continuously added to an aqueous dispersion of the polypropylene-based resin particles (C) to conduct graft polymerization at about 70° C. to about 95° C. The organic peroxide is preferably used as a redox initiator in which an organic peroxide, a transition metal, and a reducing agent are combined together. In the graft polymerization, a chain transfer agent, an emulsifier, or the like may be used in accordance with the situation.

The redox initiator is preferably a combination of an organic peroxide and a ferrous sulfate-a chelating agent-reducing agent because the redox initiator eliminates the need for a high-temperature polymerization reaction condition, so that the deterioration of the polypropylene-based resin particles (C) can be avoided to avoid a decrease in the impact resistance of the resulting molded article.

Examples of the organic peroxide include cumene hydroperoxide, diisopropylbenzene hydroperoxide, and tert-butyl hydroperoxide. The amount of organic peroxide added is preferably about 0.5 to about 4 parts by mass based on 100 parts by mass of the vinyl monomer (D1).

The redox initiator is more preferably composed of cumene hydroperoxide, ferrous sulfate, sodium pyrophosphate, and dextrose and/or lactose.

Examples of the chain transfer agent include mercaptans (such as octyl mercaptan, n- or tert-dodecyl mercaptan, n-hexadecyl mercaptan, and n- or tert-tetradecyl mercaptan), allyl compounds (such as allylsulfonic acid, methallylsulfonic acid, and sodium salts thereof), and α-methylstyrene dimer. Mercaptans are preferred because the molecular weight can be easily adjusted. As the chain transfer agent, a single type may be used alone, or two or more types may be used in combination.

The chain transfer agent may be added all at once, in portions, or continuously.

The amount of chain transfer agent added is preferably 2.0 parts or less by mass based on 100 parts by mass of the vinyl monomer (D1).

Examples of the emulsifiers include anionic surfactants, nonionic surfactants, and amphoteric surfactants.

Examples of the anionic surfactants include higher alcohol sulfates, alkylbenzene sulfonates, fatty acid sulfonates, phosphoric acid-based salts, fatty acid salts, and salts of amino acid derivatives.

Examples of the nonionic surfactants include polyethylene glycol alkyl ester-type surfactants, alkyl ether-type surfactants, and alkyl phenyl ether-type surfactants.

Examples of the amphoteric surfactants include surfactants each having an anionic moiety and a cationic moiety, the anionic moiety containing a carboxylate, sulfate, sulfonate, or phosphate, and the cationic moiety containing an amine salt or a quaternary ammonium salt.

The amount of emulsifier added is preferably 10 parts or less by mass based on 100 parts by mass of the vinyl monomer (D1).

The polypropylene-based graft polymer (E) prepared by the emulsion polymerization method is in a state of being dispersed in an aqueous medium. An example of a method for recovering the polypropylene-based graft polymer (E) from the aqueous dispersion containing the polypropylene-based graft polymer (E) is a precipitation method in which a precipitating agent is added to the aqueous dispersion, the mixture is heated and stirred, the precipitating agent is then separated, and the precipitated polypropylene-based graft polymer (E) is washed with water, dehydrated, and dried.

Examples of the precipitating agent include aqueous solutions of sulfuric acid, acetic acid, calcium chloride, magnesium sulfate, or the like. As the precipitating agent, a single type may be used alone, or two or more types may be used in combination.

If necessary, an antioxidant may be added to the aqueous dispersion containing the polypropylene-based graft polymer (E).

[Thermoplastic Resin composition I]

A thermoplastic resin composition of the present invention (hereinafter, also referred to as "thermoplastic resin composition I") contains the polypropylene-based graft polymer (E) of the present invention.

The thermoplastic resin composition I of the present invention may contain a thermoplastic resin other than the polypropylene-based graft polymer (E) of the present invention.

<Thermoplastic Resin>

Examples of the thermoplastic resin contained in the thermoplastic resin composition I of the present invention together with the polypropylene-based graft polymer (E) of the present invention include one or more of poly(vinyl chloride), polystyrene, ABS resins, ASA resins, AES resins, SAS resins derived from silicone-based rubber, AS copolymers, acrylonitrile-styrene-methyl methacrylate copolymers, styrene-acrylonitrile-N-phenylmaleimide copolymers, α-methylstyrene-acrylonitrile copolymers, polymethyl methacrylate, methyl methacrylate-styrene copolymers, methyl methacrylate-N-phenylmaleimide copolymers, polycarbonate, polyamide, polyesters, such as poly(ethylene terephthalate) and poly(butylene terephthalate), polyolefins, such as polypropylene and polyethylene, and polyphenylene ether-polystyrene composites.

<Amount of Polypropylene-Based Graft Polymer (E) Contained>

When the polypropylene-based graft polymer (E) of the present invention is added to any of these thermoplastic resins, the amount of the polypropylene-based graft polymer (E) mixed can be selected in accordance with the purpose or use, such as the use of the polypropylene-based graft polymer (E) of the present invention as a modifier or compatibilizer. The amount of polypropylene-based graft polymer (E) contained is preferably 3% to 70% by mass, more preferably 5% to 50% by mass, based on 100% by mass of all the resin components contained in the thermoplastic resin composition I.

When the amount of polypropylene-based graft polymer (E) contained is equal to or higher than the lower limit, it is possible to sufficiently provide a compatibilizing effect and a modifying effect due to the incorporation of the polypropylene-based graft polymer (E). When the amount of polypropylene-based graft polymer (E) is equal to or lower than the upper limit, it is possible to reduce the deterioration of the mechanical properties, such as impact resistance, and the appearance due to the incorporation of the polypropylene-based graft polymer (E).

The total proportion of the polypropylene resin component based on 100% by mass of all the resin components in the thermoplastic resin composition I of the present invention (the total proportion of the polypropylene resin (A) in the polypropylene-based graft polymer (E) and the propylene resin contained in the thermoplastic resin composition as another thermoplastic resin) is preferably 1% to 60% by mass, particularly preferably 5% to 40% by mass from the viewpoints of mechanical properties, such as impact resistance, appearance, adhesion strength in a two-color molded article, and so forth.

<Additives>

The thermoplastic resin composition I of the present invention may contain additives as necessary. Examples of the additives include one or more of colorants, such as pigments and dyes, fillers (such as carbon black, silica, and titanium oxide), flame retardants, stabilizers, reinforcing agents, processing aids, heat-resistant agents, antioxidants, weather-resistant agents, release agents, plasticizers, and antistatic agents.

[Molded Article I]

A molded article of the present invention (hereinafter, also referred to as "molded article I of the present invention") is obtained by molding the thermoplastic resin composition I of the present invention, and is excellent in impact resistance and appearance.

Examples of a method for molding the thermoplastic resin composition I of the present invention include an injection molding method, an injection compression molding method, an extrusion method, a blow molding method, a vacuum molding method, an air-pressure molding method, a calender molding method, and an inflation molding method. Among these, the injection molding method and the injection compression molding method are preferable because they are excellent in mass productivity and can provide a molded article with high dimensional accuracy.

The molded article I of the present invention obtained by molding the thermoplastic resin composition I of the present invention is excellent in impact resistance and appearance and thus is suitable for vehicle interior and exterior components, OA equipment, building materials, and so forth.

The thermoplastic resin composition I of the present invention contains the polypropylene-based graft polymer (E) of the present invention and thus can be subjected to two-color molding with a polypropylene-based resin to provide a two-color molded article having excellent adhesion (adhesiveness) between the resins and good appearance. Accordingly, the thermoplastic resin composition I is useful as a material for two-color molding of polypropylene-based resin/thermoplastic resin.

Such a two-color molded article can be suitably used in applications, such as vehicle interior and exterior components and electric appliances, due to the excellent characteristics of the polypropylene-based resin, such as light weight and chemical resistance, and the effect of the bonding strength due to the thermoplastic resin composition I subjected to two-color molding with the polypropylene-based resin.

Examples of industrial applications of the molded article I of the present invention obtained by molding the thermoplastic resin composition I of the present invention and the two-color molded article of the present invention using the thermoplastic resin composition I of the present invention include various exterior and interior components as vehicle components; building material components, such as wall materials and window frames; tableware; toys; home electric appliance components, such as vacuum cleaner housings, television housings, and air-conditioner housings; interior members; ship members; and communication device housings.

[Thermoplastic Resin Composition II]

A thermoplastic resin composition of the present invention (hereinafter, also referred to as "thermoplastic resin composition II of the present invention") is characterized by containing 1 to 80 parts by mass of the polypropylene-based graft polymer (E) of the present invention 20 to 99 parts by mass of a graft polymer (G) (hereinafter, also referred to as "graft polymer (G) of the present invention") prepared by graft polymerization of a vinyl monomer (D2) onto an ethylene-α-olefin rubber polymer (F) having an ethylene unit content of 50% to 95% by mass (provided that the total of the polypropylene-based graft polymer (E) and the graft polymer (G) is 100 parts by mass).

<Graft Polymer (G)>

The graft polymer (G) of the present invention is a graft polymer prepared by graft polymerization of the vinyl monomer (D2) onto the ethylene-α-olefin rubber polymer (F) having an ethylene unit content of 50% to 95% by mass. The graft polymer (G) is a copolymer rubber containing a structural unit derived from ethylene and a structural unit derived from α-olefin, and has a grafted polymer portion derived from the ethylene-α-olefin rubber polymer (F) having an ethylene unit content (proportion of the structural unit derived from ethylene) of 50% to 95% by mass and the vinyl monomer (D2), and a vinyl resin portion derived from the vinyl monomer (D2).

<Ethylene-α-Olefin Rubber Polymer (F)>

The ethylene-α-olefin rubber polymer (F) is a copolymer rubber composed of a structural unit derived from ethylene and a structural unit derived from an α-olefin, or a copolymer rubber having a structural unit derived from a non-conjugated diene in addition to these structural units.

The amount of ethylene unit constituting the ethylene-α-olefin rubber polymer (F) is 50% to 95% by mass, preferably 30% to 85% by mass, more preferably 40 to 80% by mass, even more preferably 45% to 75% by mass, from the viewpoints of the mechanical properties and moldability of the thermoplastic resin composition II of the present invention and the appearance of a molded article to be obtained.

Examples of the α-olefin include propylene, 1-butene, 1-pentene, 1-hexene, 4-methyl-1-pentene, 1-heptene, 1-octene, 1-decene, 1-dodecene, 1-hexadecene, and 1-eicosene. These α-olefins may be used alone or in combination of two or more. The α-olefin preferably has 3 to 20 carbon atoms, more preferably 3 to 12 carbon atoms, even more preferably 3 to 8 carbon atoms, from the viewpoints of the mechanical properties and the moldability of the thermoplastic resin composition II of the present invention and the appearance of the molded article to be obtained.

Examples of the non-conjugated dienes include alkenyl-norbornenes, cyclic dienes, and aliphatic dienes. These non-conjugated dienes may be used alone or in combination of two or more.

When the ethylene-α-olefin rubber polymer (F) is an ethylene-α-olefin-non-conjugated diene copolymer rubber, the upper limit of the amount of structural unit derived from the non-conjugated diene is preferably 15% by mass, more preferably 10% by mass, even more preferably 5% by mass, based on 100% by mass of the total amount of structural units constituting the ethylene-α-olefin rubber polymer (F).

From the viewpoint of millimeter-wave transparency, the ethylene-α-olefin rubber polymer (F) is preferably a copolymer composed of the ethylene unit and the α-olefin unit having 3 to 8 carbon atoms, more preferably an ethylene-propylene copolymer, an ethylene-1-butene copolymer, or an ethylene-1-octene copolymer, particularly preferably an ethylene-propylene copolymer.

The ethylene-α-olefin rubber polymer (F) may be treated with the acid-modified olefin resin (B) before use, as in the polypropylene-based resin particles (C) in the polypropylene-based graft polymer (E).

In this case, the acid-modified olefin resin (B) is used in an amount of usually 5 to 25 parts by mass, preferably 7 to 22 parts by mass, based on 100 parts by mass of the ethylene-α-olefin rubber polymer (F), and the reaction can be performed in the same manner as in the polypropylene-based resin particles (C) described above.

<Vinyl Monomer (D2)>

Examples of the vinyl monomer (D2) include aromatic vinyl compounds, vinyl cyanide compounds, (meth)acrylate compounds, maleimide compounds, unsaturated acid anhydrides, carboxy group-containing unsaturated compounds, amino group-containing unsaturated compounds, amide group-containing unsaturated compounds, hydroxy group-containing unsaturated compounds, and oxazoline group-containing unsaturated compounds. These compounds may be used alone or in combination of two or more.

The vinyl monomer (D2) preferably contains an aromatic vinyl compound. More preferably, the vinyl monomer (D2) is a monomer mixture further containing a vinyl cyanide compound.

Examples of the aromatic vinyl compound include styrene, α-methylstyrene, o-, m-, or p-methylstyrene, vinylxylene, p-tert-butylstyrene, and ethylstyrene. From the viewpoints of impact resistance and appearance of the molded article to be obtained, styrene and α-methylstyrene are preferred. As the aromatic vinyl compound, a single type may be used alone, or two or more thereof may be used in combination.

Examples of the vinyl cyanide compound include acrylonitrile and methacrylonitrile. As the vinyl cyanide compound, a single type may be used alone, or two or more types may be used in combination.

The aromatic vinyl compound content is preferably 50% to 90% by mass, more preferably 60% to 85% by mass, even more preferably 70% to 80% by mass, based on 100% by mass of the vinyl monomer (D2). When the aromatic vinyl compound content is within the above range, the molded article to be obtained is superior in color developability and impact resistance.

The vinyl cyanide compound content is preferably 10% to 50% by mass, more preferably 15% to 40% by mass, even more preferably 20% to 30% by mass, based on 100% by mass of the vinyl monomer (D2). When the vinyl cyanide compound content is within the above range, the molded article is superior in impact resistance and appearance.

As the vinyl monomer (D2), in addition to the aromatic vinyl compound and the vinyl cyanide compound, another monomer copolymerizable with these may be contained within a range that does not impair the effect of the present invention, for example, within a range of 30% or less by mass based on 100% by mass of the vinyl monomer (D2).

Examples of another monomer include (meth)acrylate compounds (such as methyl acrylate, ethyl acrylate, propyl acrylate, butyl acrylate, methyl methacrylate, ethyl methacrylate, propyl methacrylate, and butyl methacrylate) and maleimide compounds (such as n-cyclohexylmaleimide and N-phenylmaleimide). As another monomer, a single type may be used alone, or two or more types may be used in combination.

<Graft Polymer (G)>

The graft polymer (G) is prepared by graft polymerization of the vinyl monomer (D2) in the presence of the ethylene-α-olefin rubber polymer (F).

The graft polymer (G) thus prepared has a grafted polymer portion derived from the ethylene-α-olefin rubber polymer (F) and the vinyl monomer (D2), and a vinyl resin portion derived from the vinyl monomer (D2).

The rubbery polymer portion content and the vinyl resin portion content are preferably 10% to 90% by mass and 90% to 10% by mass, more preferably 20% to 80% by mass and 80% to 20% by mass, even more preferably 25% to 75% by mass and 75% to 25% by mass, respectively, based on 100% by mass of the total of the rubbery polymer portion and the vinyl resin portion constituting the graft polymer (G), from the viewpoints of mechanical properties, moldability, and the appearance of a molded article to be obtained, The degree of grafting of the graft polymer (G) is preferably 20% or more by mass, more preferably 30% or more by mass, particularly preferably 35% to 65% by mass, from the viewpoints of mechanical properties, moldability, and the appearance of a molded article to be obtained.

The degree of grafting of the graft polymer (G) is a value measured by a method described in the section of Examples below.

Substitute Specification-Clean

Examples of a graft polymerization method of the vinyl monomer (D2) onto the ethylene-α-olefin rubber polymer (F) include known polymerization methods (such as an emulsion polymerization method, a solution polymerization method, a suspension polymerization method, a bulk polymerization method, and a combination thereof).

The thermoplastic resin composition II of the present invention may contain only one type of graft polymer (G), or may contain two or more types of the graft polymers (G) having different physical properties, different types of copolymerizable components, different copolymerization compositions, and the like.

<Thermoplastic Resin>

The thermoplastic resin composition II of the present invention may contain a thermoplastic resin other than the polypropylene-based graft polymer (E) or the graft polymer (G) of the present invention.

Examples of the thermoplastic resin, other than the polypropylene-based graft polymer (E) or the graft polymer (G) of the present invention, that may be contained in the thermoplastic resin composition II of the present invention include those described above as the thermoplastic resin, other than the polypropylene-based graft polymer (E), that may be contained in the thermoplastic resin composition I of the present invention.

<Component Content>

The thermoplastic resin composition II of the present invention has a polypropylene-based graft polymer (E) content of 1 to 80 parts by mass and a graft polymer (G) content of 20 to 99 parts by mass, preferably a polypropylene-based graft polymer (E) content of 10 to 80 parts by mass and a graft polymer (G) content of 20 to 90 parts by mass, more preferably a polypropylene-based graft polymer (E) content of 20 to 75 parts by mass and a graft polymer (G) content of 25 to 80 parts by mass, particularly preferably a polypropylene-based graft polymer (E) content of 35 to 75 parts by mass and a graft polymer (G) content of 25 to 65 parts by mass, based on 100 parts by mass of the total of the polypropylene-based graft polymer (E) content and the graft polymer (G) content.

The mixing proportion can be selected in accordance with the purpose and application. When the proportion of the polypropylene-based graft polymer (E) content and the graft polymer (G) content is within the above range, the thermoplastic resin composition II of the present invention can effectively provide the effects and stability of the millimeter-wave characteristics while the deteriorations of the mechanical properties, such as impact resistance, and the appearance are reduced or while the mechanical properties and the appearance are improved.

When the thermoplastic resin composition II of the present invention contains another thermoplastic resin other than the polypropylene-based graft polymer (E) and the graft polymer (G) of the present invention, the amount of another thermoplastic resin contained is preferably 0 to 200 parts by mass, particularly preferably 10 to 190 parts by mass, especially preferably 20 to 150 parts by mass, based on 100 parts by mass of the total of the polypropylene-based graft polymer (E) and the graft polymer (G).

The amount of thermoplastic resin mixed can be selected in accordance with the purpose and application. When the amount of thermoplastic resin mixed is within the above range, the thermoplastic resin composition II of the present invention can effectively provide the effects and the stability of the millimeter-wave characteristics while the deteriorations of the mechanical properties, such as impact resistance, and the appearance are reduced or while the mechanical properties and the appearance are improved.

The total proportion of the polypropylene resin component based on 100% by mass of all the resin components in the thermoplastic resin composition II of the present invention (the total proportion of the polypropylene resin (A) in the polypropylene-based graft polymer (E) and a propylene resin as another thermoplastic resin contained in the thermoplastic resin composition II) is preferably 5% to 40% by mass, particularly preferably 10% to 35% by mass, especially preferably 13% to 32% by mass, from the viewpoints of, for example, the mechanical properties, such as impact resistance, and the appearance, and providing the effects of the millimeter-wave characteristics efficiently and stably.

<Additives>

The thermoplastic resin composition II of the present invention may contain additives as necessary. Examples of the additives include those exemplified as additives that may be included in the thermoplastic resin composition I described above.

[Molded Article II]

The molded article of the present invention (hereinafter, also referred to as "molded article II of the present invention") is obtained by molding the thermoplastic resin composition II of the present invention, and is excellent in impact resistance and appearance, and also excellent in millimeter-wave characteristics and stability.

The quality of the appearance of the molded article II composed of the thermoplastic resin composition II of the present invention can be evaluated by a method described in the section of Examples below. The molding appearance, such as color developability (L* value in the case of coloring with carbon black) and surface gloss evaluated here is also related to the dispersion state of the polypropylene resin component (undyed portion) observed in a transmission electron microscope image (magnification: 10,000×) obtained by a method described in the section of Examples below. The molding appearance of the molded article II composed of the thermoplastic resin composition II of the present invention can also be evaluated by the ratio of the total perimeter $\Sigma L$ (μm) per 1 μm$^2$ of the undyed portion to the total area ES (μm$^2$) measured by a method described in the section of Examples below. When this value is larger, the polypropylene resin component is more finely dispersed in the matrix, resulting in superior appearance. The ratio of the total perimeter $\Sigma L$ (μm) per 1 μm$^2$ of the undyed portion/total area $\Sigma S$ (μm$^2$) of the molded article II composed of the thermoplastic resin composition II of the present invention is preferably 0.08 or more, more preferably 0.1 or more, from the viewpoint of the molding appearance.

Examples of a method for molding the thermoplastic resin composition II of the present invention include an injection molding method, an injection compression molding method, an extrusion method, a blow molding method, a vacuum molding method, an air-pressure molding method, a calender molding method, and an inflation molding method. Among these, the injection molding method and the injection compression molding method are preferable because they are excellent in mass productivity and can provide a molded article with high dimensional accuracy.

The molded article II of the present invention obtained by molding the thermoplastic resin composition II of the present invention is excellent in impact resistance and appearance, and can stably exhibit millimeter-wave characteristics. Thus, the molded article II of the present invention is suitable for millimeter-wave radar components, radomes for millimeter-wave radars, and millimeter-wave radars, which require such characteristics, and can also be used as a vehicle component. Moreover, the molded article II of the present invention can also be suitably used for ship members, communication devices, OA devices, mobile devices, toys, and home electric appliance components, such as vacuum cleaners, television sets, and air conditioners.

[Millimeter-Wave Radome and Millimeter-Wave Radar]

The molded article II composed of the thermoplastic resin composition II of the present invention is excellent in millimeter-wave characteristics and stability thereof and thus can be used for a millimeter-wave radome as a resin component that transmits millimeter waves. Specifically, a millimeter-wave radome can be formed only of the molded article II of the present invention. In addition, a millimeter-wave radome can be formed of the molded article II of the present invention as a millimeter wave-transparent resin component in combination with another resin component.

The millimeter-wave radome using the molded article II of the present invention can provide a millimeter-wave radar with excellent millimeter-wave characteristics and stability thereof, high accuracy, and excellent reliability.

EXAMPLES

The present invention is described below further specifically with reference to Examples and Comparative examples below. The present invention is not limited to Examples below without departing from the scope of the present invention.

Hereinafter, the expression "part" means "part by mass", and the expression "%" means "% by mass".

[Measurement, Evaluation, and Operation Methods]

Various measurements, evaluations, and operation methods therefor in the following Examples and Comparative Examples are described below.

<Measurement of Average Particle Size>

A volume-average particle size (MV) measured with a Microtrac ("Nanotrac 150" available from Nikkiso Co., Ltd.) and deionized water as a measurement solvent was defined as an average particle size.

<Calculation of Degree of Grafting-1>

To 80 mL of acetone, 1 g of the polypropylene-based graft polymer (E) was added. The resulting mixture was heated to reflux at 65° C. to 70° C. for 3 hours. The resultant acetone suspension was subjected to centrifugation at 14,000 rpm for 30 minutes with a centrifuge ("CR21E", available from Hitachi Koki Co., Ltd.) to separate a precipitated component (acetone-insoluble component) and an acetone solution (acetone-soluble component). The precipitated component (acetone-insoluble component) was dried. The mass (Ya (g)) thereof was measured. The degree of grafting was calculated from formula (1) below.

In formula (1), Ya is the mass (g) of the acetone-insoluble component of the polypropylene-based graft polymer (E), Xa is the total mass (g) of the polypropylene-based graft polymer (E) used to determine Ya, and the particle mass fraction is the proportion of the polypropylene-based resin particles (C) contained in the polypropylene-based graft polymer (E) in terms of solid content.

$$\text{Degree of grafting (\%)} = \{(\text{Ya} - \text{Xa} \times \text{particle mass fraction})/\text{Xa} \times \text{particle mass fraction}\} \times 100 \qquad (1)$$

<Calculation of Degree of Grafting—2>

To 80 mL of acetone, 1 g of the graft polymer (G) was added. The resulting mixture was heated to reflux at 65° C. to 70° C. for 3 hours. The resultant acetone suspension was subjected to centrifugation at 14,000 rpm for 30 minutes with a centrifuge ("CR21E", available from Hitachi Koki Co., Ltd.) to separate a precipitated component (acetone-insoluble component) and an acetone solution (acetone-soluble component). The precipitated component (acetone-insoluble component) was dried. The mass (Yb (g)) thereof was measured. The degree of grafting was calculated from formula (2) below.

In formula (2), Yb is the mass (g) of the acetone-insoluble component of the graft polymer (G), Xb is the total mass (g) of the ethylene-α-olefin rubber polymer (F) used to determine Yb), and the rubber mass fraction is the proportion of the ethylene-α-olefin rubber polymer (F) contained in the graft polymer (G) in terms of solid content.

$$\text{Degree of grafting (\%)} = \{(\text{Yb} - \text{Xb} \times \text{rubber mass fraction})/\text{Xb} \times \text{rubber mass fraction}\} \times 100 \qquad (2)$$

<Melt-Kneading>

The resin components were mixed in accordance with the formulations given in Tables 1 and 2. The resulting mixtures were each melt-kneaded in a twin-screw extruder with a 30-mm-diameter vacuum vent ("PCM30", available from Ikegai Corporation) at a cylinder temperature of 200° C. to 260° C. and a vacuum of 93.325 kPa to prepare a transparent thermoplastic resin composition. After the melt-kneading, pelletization was performed with a pelletizer ("SH-type pelletizer", available from Souken Co., Ltd).

<Measurement of Melt Volume Rate (MVR)>

The MVR of the thermoplastic resin composition prepared by melt-kneading was measured at 220° C. and 10 kgf according to the ISO 1133 standard. The MVR is a measure of the fluidity of the thermoplastic resin composition.

<Injection Molding 1 (Evaluation of Physical Properties)

The pellets of the thermoplastic resin composition produced by the melt-kneading were molded with an injection molding machine ("IS55FP-1.5A", available from Toshiba Machine Co., Ltd.) under the conditions of a cylinder temperature of 200° C. to 270° C. and a mold temperature of 60° C. to form a molded article having a length of 80 mm, a width of 10 mm, and a thickness of 4 mm, thereby resulting in molded article 1 for measuring physical properties.

<Injection Molding 2 (Appearance Evaluation)>

With a Henschel mixer, 100 parts of pellets of the thermoplastic resin composition produced by melt-kneading and 0.8 parts of carbon black were mixed. The resulting mixture was supplied to an extruder heated to 240° C. and kneaded to produce black pellets. The black pellets were molded with an injection molding machine ("IS55FP-1.5A" available from Toshiba Machine Co., Ltd.) under the conditions of a cylinder temperature of 200° C. to 270° C. and a mold temperature of 60° C. to form a plate having a length of 100 mm, a width of 100 mm, and a thickness of 1 mm, thereby resulting in molded article 2 for appearance evaluation.

<Injection Molding 3 (Two-Color Molding)>

A homopolypropylene resin (FY4, available from Japan Polypropylene Corporation) was molded with an injection molding machine ("IS55FP-1.5A" available from Toshiba Machine Co., Ltd.) at a cylinder temperature of 200° C. to 270° C. and a mold temperature of 60° C. to form a plate having a length of 100 mm, a width of 100 mm, and a thickness of 1 mm.

The plate was fixed in a mold having a length of 100 mm, a width of 100 mm and a thickness of 3 mm. The pellets of the thermoplastic resin composition produced by the melt-kneading were injection-molded to form a two-color molded evaluation sample in which a thermoplastic resin composition layer formed by the melt-kneading adhered to a surface of a homopolypropylene resin plate.

<Injection Molding 4 (Molded Article for Coating)>

The pellets of the thermoplastic resin composition produced by the melt-kneading were molded into a plate having a length of 100 mm, a width of 100 mm, and a thickness of 3 mm with an injection molding machine ("IS55FP-1.5A", available from Toshiba Machine Co., Ltd.) under the conditions of a cylinder temperature of 200° C. to 270° C. and a mold temperature of 60° C., thereby resulting in molded article 3 for coating.

<Injection Molding 5 (Evaluation of Dielectric Properties)>

The pellets of the thermoplastic resin composition produced by the melt-kneading were molded into a molded article having a length of 80 mm, a width of 10 mm, and a thickness of 4 mm with an injection molding machine ("IS55FP-1.5A", available from Toshiba Machine Co., Ltd.) under the conditions of a cylinder temperature of 200° C. to 270° C. and a mold temperature of 60° C. The flow end portion of the resulting molded article on the opposite side of the gate was cut to a 10 mm×10 mm square, and then processed to a thickness of 0.244 mm with a surface grinder, thereby resulting in molded article 4 for measuring dielectric properties.

<Injection Molding 6 (Evaluation of Tensile Properties)>

The pellets of the thermoplastic resin composition produced by the melt-kneading were molded with an injection molding machine ("IS55FP-1.5A", available from Toshiba Machine Co., Ltd.) under the conditions of a cylinder temperature of 200° C. to 270° C. and a mold temperature of 60° C. to form a dumbbell-shaped tensile test specimen, which was a molded article, having a total length of 170 mm, a length of 80 mm in a parallel portion, a width of 10 mm in a parallel portion in a central part, and a thickness of 4 mm, thereby resulting in molded article 5 for measuring tensile properties.

<Measurement of Density>

The density of the molded article 1 produced in the injection molding 1 was measured according to the ISO 1183 standard.

<Measurement of Charpy Impact Strength>

The molded article 1 produced in the injection-molding 1 was subjected to a Charpy impact test (notched) at 23° C. in accordance with the ISO 179 standard to measure the Charpy impact strength.

<Measurement of Heat Deflection Temperature Under Load>

The heat deflection temperature (HDT) under load (° C.) of the molded article 1 produced in the injection-molding 1 was measured by the edgewise method in accordance with the ASTM D648 standard.

<Measurement of Hardness>

The Rockwell hardness of the molded article 1 produced in the injection-molding 1 was measured in accordance with ISO 2039.

<Appearance Evaluation of Molded Article>

(Visual Evaluation 1)

The molded article 2 produced in the injection molding 2 was visually evaluated, and the evaluation results were described as follows.

$N_\circ$: The molding appearance is free of defects, and there is no problem in practical use.

Peel: The molded article has a peeled surface layer and is not practical.

Surface unevenness: The molded article has an uneven surface and is not practical.

(Visual Evaluation 2)

With respect to the molded article 2 produced in the injection molding 2, the surface layer portion and the gate peripheral portion of the molded article and were visually evaluated, and the evaluation results were described as follows.

No problem: The molding appearance is free of defects, and there is no problem in practical use.

Peeled: The molded article has a peeled surface layer and is not practical.

Blushing/haze: The molded article has a blushed or haze surface and is not practical.

(Evaluation of Color Developability)

The lightness $L^*$ of the molded article 2 produced in the injection molding 2 was measured by an SCE method with a spectrocolorimeter ("CM 3500d", available from Konica Minolta Optips Inc). The measured $L^*$ is defined as "$L^*$ (ma)". As the $L^*$ was lower, the color became black, and the color developability was determined to be good.

"Lightness $L^*$" refers to a value ($L^*$) of lightness among color values in the $L^*a^*b^*$ colorimetric system used in JIS Z8729.

The "SCE method" refers to a method for measuring a color by removing specular reflection light with a light trap using a spectrocolorimeter in conformity with JIS Z8722.

(Measurement of Surface Gloss)

With respect to the molded product 2 obtained in the injection molding 2, the reflectance (%) of the surface of the molded product at an incident angle of 60° and a reflection angle of 60° was measured in accordance with JIS K7105 with "Digital Variable Angle Gloss Meter UGV-5D", available from Suga Test Instruments Co., Ltd. Higher reflectance indicates better surface appearance.

(Analysis of TEM Image)

A thin film having a thickness of 100 nm was prepared from a sample cut from the molded article 2 formed in the injection molding 2. This thin film was dyed with ruthenium tetroxide ($RuO_4$) to provide a thin film for transmission electron microscope (TEM) observation.

This thin film for TEM observation was observed with a transmission electron microscope JEM-1400plus (JEOL, Ltd.) at a magnification of 10,000× to obtain a TEM image.

This TEM image was subjected to binarization image processing of the dyed portion (styrene-containing component) and the undyed portion (polypropylene resin component). The total area $\Sigma S$ ($\mu m^2$) of the undyed portion (polypropylene resin component) was measured.

After the binarization of the obtained TEM image, the lengths of the phase interfaces of the undyed component (polypropylene resin component) was measured, and the sum of the lengths was defined as the total perimeter $\Sigma L$ ($\mu m$) of the undyed portion (polypropylene resin component).

From these values, the ratio of the total perimeter $\Sigma L$ per 1 $\mu m^2$ of the undyed portion ($\mu m$)/total area $\Sigma S$ ($\mu m^2$) was calculated.

<Appearance Evaluation of Two-Color Molded Article>

The appearance of the two-color molded evaluation sample produced in the injection molding 3 was visually observed from the homopolypropylene resin side and evaluated according to the following criteria.

○: The entire surface is in close contact, and an air layer or the like is not observed.

Δ: Almost the entire surface is in close contact, but an air layer is observed in a portion that is not in close contact.

x: No close contact is observed, and the air layer can be seen over substantially the entire surface.

<Evaluation of Adhesion Strength of Two-Color Molded Article>

The two-color molded evaluation sample produced in the injection molding 3 was cut to a width of 22 mm in the resin flow direction. The homopolypropylene resin plate and the thermoplastic resin composition layer were peeled off by about 20 mm with a box cutter at their adhesive interface. The homopolypropylene resin plate was bent at right angles to the plate. With a Strograph VE50 available from Toyo Seiki Seisaku-sho, Ltd., the bent portion of the homopolypropylene plate was held with a universal gripping jig, a tensile test was performed at 5 mm/min so as to be perpendicular to the plate. The maximum value of the tensile force between displacements of 2 to 6 mm was defined as the adhesion strength. The fact that this adhesion strength is higher indicates superior adhesion strength.

<Evaluation of Coating Appearance>

The molded article 3 for coating produced in the injection molding 4 was spray-coated with a urethane-based coating material, and evaluated according to the following criteria.

○: The molded article has no unevenness at all on the surface and has no practical problems.

x: The molded article has unevenness all over the surface and does not reach a practical level.

<Measurement of Tensile Strain at Break>

With respect to the molded article 5 produced in the injection molding 6, the tensile strain at break (%) of a dumbbell-shaped tensile test specimen was measured at a chuck-to-chuck distance of 115 mm and a tensile speed of 50 mm/min in accordance with ISO 527.

<Measurement of Flexural Modulus>

With respect to the molded article 1 produced in the injection molding 1, a test specimen (10 mm wide, 4 mm thick, and 80 mm long) was subjected to a three-point bending test at a distance between supports of 64 mm and a bending speed of 2 mm/min to measure the flexural modulus in accordance with ISO 178.

<Measurement of Relative Dielectric Constant and Dielectric Loss Tangent (tan 0)>

With respect to the molded article 4 produced in the injection molding 5, the relative dielectric constant and the dielectric loss tangent at a frequency of about 77 GHZ were measured by a cut-off circular waveguide method (JIS R1660-1) with an apparatus available from Agilent Technologies Inc. The frequency was determined in accordance with the thicknesses and the relative dielectric constant of the test specimen. Thus, the thickness of the molded article 3 used as the test specimen was set to 0.244 mm, and the measurement was performed. Ten test specimens were produced and measured. For the relative dielectric constant, the minimum value and the maximum value of 10 measured values, and the average value of the measurement results were described. For the dielectric loss tangent, the average value is described.

<Polypropylene Resin (A)>

The following was used as the polypropylene resin (A). Prime Polymer Co., Ltd.: Polypropylene random copolymer "Prime Polypro J229E"

MFR: 50 g/10 min (230° C./load 50 N)

<Acid-Modified Polyolefin Resin (B)>

The following was used as an acid-modified olefin polymer (B-1).

Mitsui Chemicals, Inc.: Maleic anhydride-modified polypropylene

"Hiwax NP0555A"

Amount of maleic anhydride grafted: 3% by mass

Acid value: 45 mgKOH/g

The following was used as the acid-modified olefin polymer (B-2).

Mitsui Chemicals, Inc.: Maleic anhydride-modified polypropylene

"Hiwax 2203A"

Mass-average molecular weight: 2,700

Acid value: 30 mgKOH/g

<Production of Polypropylene-Based Resin Particles (C)>

First, 100 parts of polypropylene resin (A), 20 parts of acid-modified olefin polymer (B-1), and 5 parts of potassium oleate as an anionic emulsifier were mixed.

This mixture was fed to a twin-screw extruder ("PCM30", available from Ikegai Corporation, L/D=40) through its hopper at a rate of 4 kg/h, melt-kneaded under heating at 220° C. while an aqueous solution of a mixture of 0.63 parts of potassium hydroxide and 3.87 parts of ion-exchanged water was continuously fed from a feed port disposed at a vent portion of the twin-screw extruder, and extruded. The melt-kneaded product was continuously supplied to a cooling device attached to the tip of the twin-screw extruder and cooled to 90° C. The solid ejected from the tip of the twin-screw extruder was fed into hot water of 80° C., continuously dispersed, and diluted to a solid content concentration of about 40% to prepare an aqueous dispersion of polypropylene-based resin particles (C). The volume-average particle size of the polypropylene-based resin particles (C) was 500 nm.

<Production of Polypropylene-Based Graft Polymer (E-1)>

In a stainless-steel polymerization tank equipped with a stirrer, 60 parts of the aqueous dispersion of the polypropylene-based resin particles (C) was placed in terms of a solid content. Ion-exchanged water was added in such a manner that the solid content concentration was 30%. Then 0.008 parts of ferrous sulfate, 0.35 parts of sodium pyrophosphate, and 0.35 parts of fructose were fed thereto. The temperature was adjusted to 80° C. Then, 30 parts of styrene, 10 parts of acrylonitrile, and 0.62 parts of cumene hydroperoxide were continuously added for 150 minutes. Emulsion polymerization was performed while the polymerization temperature was maintained at 80° C. to prepare an aqueous dispersion containing a polypropylene-based graft polymer having a volume-average particle size of 510 nm.

An antioxidant was added to the aqueous dispersion containing the polypropylene-based graft polymer. The solid content was precipitated with sulfuric acid, followed by washing, dehydration, and drying to give a powdery polypropylene-based graft polymer.

The degree of grafting of this polypropylene-based graft polymer was measured and found to be 30%.

The powdery polypropylene-based graft polymer had no solvent odor because no organic solvent was used.

<Production of Polypropylene-Based Graft Polymer (e-1)>

A polypropylene-based graft polymer (e-1) was prepared by solution polymerization of 49 parts of styrene and 21 parts of acrylonitrile in 100 parts of a toluene solvent in the presence of 30 parts of the polypropylene resin (A). The degree of grafting of this graft copolymer (e-1) was 38.2%. The particle size of the polypropylene-based resin portion of the graft polymer (e-1) was not able to be determined.

<Production of Graft Polymer (G-1)>

Styrene and acrylonitrile were subjected to solution polymerization in a toluene solvent in the presence of an ethylene-propylene copolymer rubber having an ethylene unit content of 56% and a propylene unit content of 44% to prepare a graft polymer (G-1) containing an ethylene-α-olefin rubber. This graft polymer (G-1) was a rubber-reinforced resin containing 45% of a grafted polymer portion in which styrene and acrylonitrile were graft-polymerized onto the ethylene-propylene copolymer rubber and 53.4% of an ungrafted acrylonitrile-styrene copolymer resin. The graft polymer (G-1) had a degree of grafting of 50%, an ethylene-propylene copolymer rubber portion content of 30%, an acrylonitrile unit content of 21%, and a styrene unit content of 49%.

<Production of Graft Polymer (G-2)>

First, 100 parts of an ethylene-propylene-non-conjugated diene copolymer (EPT3012P, available from Mitsui Chemicals, Inc., ethylene unit content: 73%, 5-ethylidene-2-norbornene content (as a non-conjugated diene component): 4%), 20 parts of the acid-modified olefin polymer (B-2), and 5 parts of potassium tallowate (a mixture of potassium oleate, potassium stearate, and potassium palmitate) as an anionic emulsifier were mixed.

This mixture was fed to a twin-screw extruder ("PCM30", available from Ikegai Corporation, L/D=40) through its hopper at a rate of 4 kg/h, melt-kneaded under heating at 220° C. while an aqueous solution of a mixture of 0.5 parts of potassium hydroxide and 2.4 parts of ion-exchanged water was continuously fed from a feed port disposed at a vent portion of the twin-screw extruder, and extruded. The melt-kneaded product was continuously supplied to a cooling device attached to the tip of the twin-screw extruder and cooled to 90° C. The solid ejected from the tip of the twin-screw extruder was fed into hot water of 80° C., continuously dispersed, and diluted to a solid content concentration of about 40% by mass to prepare an aqueous dispersion of an olefin resin.

This aqueous dispersion of the olefin resin (60 parts, as solid content of the ethylene-propylene-non-conjugated diene copolymer) was placed in a stainless-steel polymerization tank equipped with a stirrer. Ion-exchanged water was added to the aqueous dispersion of the olefin resin in such a manner that the solid content concentration was 30%.

Then 0.006 parts of ferrous sulfate, 0.3 parts of sodium pyrophosphate, 0.35 parts of fructose, and 1.0 part of potassium tallowate (mixture of potassium oleate, potassium stearate, and potassium palmitate) were fed thereto. The temperature was adjusted to 80° C. To this, 30 parts of styrene, 10 parts of acrylonitrile, and 1.0 part of cumene hydroperoxide were continuously added for 150 minutes. Emulsion polymerization was performed while the polymerization temperature was maintained at 80° C., thereby preparing an aqueous dispersion containing a graft polymer (G-2). An antioxidant was added to the aqueous dispersion containing the graft polymer (G-2). The solid content was precipitated with sulfuric acid, followed by dehydration, washing, and drying to give a powdery graft polymer (G-2).

This graft polymer (G-2) was a rubber-reinforced resin containing 84% of a grafted polymer portion in which styrene and acrylonitrile were graft-polymerized onto the ethylene-propylene copolymer rubber and 15.2% of an ungrafted acrylonitrile-styrene copolymer resin. The graft polymer (G-2) had a degree of grafting of 40%, an ethylene-propylene copolymer rubber portion content of 60%, an acrylonitrile unit content of 10%, and a styrene unit content of 30%.

<Production of ABS Resin>

A reaction vessel was charged with 50 parts of polybutadiene (gel content: 94%, average particle size: 290 nm), 35 parts of styrene, 15 parts of acrylonitrile (5% in the monomer components), 0.1 part of tert-dodecyl mercaptan, 1.0 part of sodium rosinate, 0.05 parts of potassium hydroxide, and 160 parts of deionized water. The temperature was raised to 60° C., and impregnation was performed for 60 minutes. Thereafter, 0.3 parts of tert-hexyl peroxypivalate was added thereto. The temperature was raised to 75° C., and polymerization was performed for 2 hours. An antioxidant was added to the resulting latex. The mixture was put into an aqueous solution of calcium chloride to solidify, followed by washing, dehydration, and drying to give an ABS resin.

<Production of AS Copolymer-1>

First, 120 parts of ion-exchanged water, 0.1 parts of polyvinyl alcohol, 0.3 parts of azobisisobutyronitrile, 30 parts of acrylonitrile, 70 parts of styrene, and 0.35 parts of tert-dodecyl mercaptan were fed into a nitrogen-purged stainless-steel polymerization tank equipped with a stirrer. The mixture was reacted at an initiation temperature of 60° C. for 5 hours. The mixture was heated to 120° C. and reacted for 4 hours. The content was taken out, washed, and dried to give a powdery AS copolymer-1.

<Production of AS Copolymer-2>

First, 120 parts of ion-exchanged water, 0.1 parts of polyvinyl alcohol, 0.3 parts of azobisisobutyronitrile, 25 parts of acrylonitrile, 75 parts of styrene, and 0.35 parts of tert-dodecyl mercaptan were fed into a nitrogen-purged stainless-steel polymerization tank equipped with a stirrer. The mixture was reacted at an initiation temperature of 60° C. for 5 hours. The mixture was heated to 120° C. and reacted for 4 hours. The content was taken out, washed, and dried to give a powdery AS copolymer-2.

<Aromatic Polycarbonate Resin (PC)>

As the aromatic polycarbonate resin, "Iupilon S-2000F" (viscosity-average molecular weight (Mv): 22,000) available from Mitsubishi Engineering-Plastics Corporation was used.

Examples and Comparative Examples of Thermoplastic Resin Composition I

Example I-1

The polypropylene-based graft polymer (E-1), the ABS resin, and the AS copolymer-1 were mixed in accordance with the formulations given in Table 1. The resulting mixtures were each melt-kneaded in a twin-screw extruder with a 30-mm-diameter vacuum vent ("PCM30", available from Ikegai Corporation) at a cylinder temperature of 200° C. to 260° C. and a vacuum of 93.325 kPa to prepare a transparent

Comparative Example I-3

Pellets of a thermoplastic resin composition were produced in the same manner as in Example I-1, except that the polypropylene-based graft polymer (E-1) was not used and the resin component formulation was as given in Table 1.

The specific gravity and MVR of each pellet of Examples I-1 to I-4 and Comparative examples I-1 to I-3 were measured. The pellets of the thermoplastic resin compositions were molded into various molded articles, and the molded articles were evaluated as described above.

Table 1 presents these results.

TABLE 1

|  |  | Example I-1 | Example I-2 | Example I-3 | Example I-4 | Comparative example I-1 | Comparative example I-2 | Comparative example I-3 |
|---|---|---|---|---|---|---|---|---|
| Resin | ABS resin | 45 | 45 | 45 | 45 | 45 | 45 | 45 |
| component | AS copolymer-1 | 46.7 | 38.3 | 21.7 | 5 | 50 | 35 | 55 |
| formulation | Polypropylene-based graft polymer (E-1) | 8.3 | 16.7 | 33.3 | 50 |  |  |  |
| (part) | Polypropylene resin (A) |  |  |  |  | 5 | 20 |  |
| Polypropylene resin component content of thermoplastic resin composition (%) |  | 5 | 5 | 20 | 30 | 5 | 20 | 0 |
| General | Density (g/cm$^3$) | 1.032 | 1.022 | 1.001 | 0.988 | 1.031 | 1.002 | 1.042 |
| physical | MVR (cm$^3$/min) | 21.8 | 23 | 35.2 | 49.1 | 32.8 | 100.5 | 19.9 |
| properties | Charpy impact strength (kJ/m$^2$) | 29 | 29 | 14 | 8 | 18 | 5 | 34 |
|  | Heat deflection temperature under load (° C.) | 78 | 76 | 72 | 68 | 77 | 73 | 79 |
|  | Rockwell hardness | 102 | 94 | 83 | 73 | 99 | 75 | 109 |
| Appearance | Appearance (visual observation) | no | no | no | no | peeling | surface unevenness | no |
|  | L * | 12 | 15.1 | 19.6 | 19.9 | 13.7 | 19.7 | 8.4 |
|  | Gloss (60°) (%) | 95 | 91 | 74 | 68 | 93 | 67 | 96 |
| Heterogeneous | Two-color molding (plate appearance) | Δ | ○ | ○ | ○ | x | ○ | x |
| adhesion | Two-color molding (adhesion strength) (N) | 2.0 | 2.7 | 4.1 | 5.1 | 1.24 | 5.6 | 0.1 |
| Coating appearance |  | ○ | ○ | ○ | ○ | ○ | ○ | ○ | thermoplastic resin composition. The resulting thermoplastic resin composition had a polypropylene resin component content of 5% by mass. After the melt-kneading, pelletization was performed using a pelletizer ("SH type pelletizer", available from Souken Co., Ltd).

The resulting pellets had a cylindrical shape with a diameter of 3 mm and a length of 3 mm, and each pellet weighed 21 mg.

Examples I-2 to 4

Pellets of thermoplastic resin compositions were produced in the same manner as in Example I-1, except that the resin component formulations were as given in Table 1. The polypropylene resin component contents of the resulting thermoplastic resin compositions were 5% by mass in Example I-2, 20% by mass in Example I-3, and 30% by mass in Example I-4.

Comparative Examples I-1 and 2

Pellets of thermoplastic resin compositions were produced in the same manner as in Example I-1, except that the polypropylene resin (A) was used in place of the polypropylene-based graft polymer (E-1) and the resin component formulations were as given in Table 1. The polypropylene resin component contents of the resulting thermoplastic resin compositions were 5% by mass in Comparative example I-1 and 20% by mass in Comparative example I-2, Table 1 indicates the following.

In Examples I-1 to I-4, it is found that although the impact strength tends to be lower than the impact strength of the ABS resin/AS copolymer composition of Comparative example I-3, there is no problem in appearance even at a higher polypropylene resin component content.

In Comparative examples I-1 and I-2 in which the polypropylene resin (A) was incorporated in place of the polypropylene-based graft polymer (E-1), the impact strength was markedly low, and the appearance was poor.

The two-color molded articles in Examples I-1 to I-4 are excellent in appearance and adhesion strength.

In Comparative example I-1, the adhesion strength and the appearance are poor. In Comparative example I-2, the adhesion strength and the appearance are good, but as described above, the impact strength and the appearance of the single-component molded article are poor.

The two-color molded article in Comparative example I-3 has poor adhesion strength and poor appearance.

Examples and Comparative Examples of Thermoplastic Resin Composition II

Example II-1

The polypropylene-based graft polymer (E-1), the AS copolymer-2, and the graft polymer (G-1) were mixed in accordance with the formulations given in Table 2. The resulting mixtures were each melt-kneaded in a twin-screw extruder with a 30-mm-diameter vacuum vent ("PCM30", available from Ikegai Corporation) at a cylinder temperature of 200° C. to 260° C. and a vacuum of 93.325 kPa to prepare a transparent thermoplastic resin composition. The resulting thermoplastic resin composition had a polypropylene resin component content of 15% by mass. After the melt-kneading, pelletization was performed using a pelletizer ("SH type pelletizer", available from Souken Co., Ltd).

The resulting pellets had a cylindrical shape with a diameter of 3 mm and a length of 3 mm, and each pellet weighed 21 mg.

Examples II-2 to 5

Pellets of thermoplastic resin compositions were produced in the same manner as in Example II-1, except that the resin component formulations were as given in Table 2. The polypropylene resin component contents of the resulting thermoplastic resin compositions are 30% by mass in each of Examples II-2 and II-4, and 15% by mass in each of Example II-3 and Example II-5.

Comparative Examples II-1 and 2

Pellets of thermoplastic resin compositions were produced in the same manner as in Example II-1, except that the polypropylene resin (A) was used in place of the polypropylene-based graft polymer (E-1) and the resin component formulations were as given in Table 2. The polypropylene resin component contents of the resulting thermoplastic resin compositions are 15% by mass in Comparative example II-1 and 30% by mass in Comparative example II-2.

Comparative Example II-3

Pellets of a thermoplastic resin composition were produced in the same manner as in Example II-1, except that the polypropylene-based graft polymer (e-1) was used in place of the polypropylene-based graft polymer (E-1) and the resin component formulation was as given in Table 2.

Comparative Example II-4

Pellets of a thermoplastic resin composition were produced in the same manner as in Example II-1, except that the polypropylene-based graft polymer (E-1) was not used, only the graft copolymers (G-1) and (G-2) were used, and the resin component formulation was as given in Table 2.

The specific gravity (density) and MVR of each pellet of Examples II-1 to 4 and Comparative examples II-1 to 4 were measured. The pellets of the thermoplastic resin compositions were molded into various molded articles, and the molded articles were evaluated as described above.

Table 2 presents these results.

Table 3 presents the results of analysis of the TEM images of Examples II-1 and 2 and Comparative examples II-1 and 2.

TABLE 2

| | | | Example II-1 | Example II-2 | Example II-3 | Example II-4 | Example II-5 | Comparative example II-1 | Comparative example II-2 | Comparative example II-3 | Comparative example II-4 |
|---|---|---|---|---|---|---|---|---|---|---|---|
| Resin component formulation (part) | Polypropylene-based graft polymer (E) | E-1 | 25 | 50 | 25 | 50 | 25 | | | | |
| | Comparative polypropylene-based graft polymer | e-1 | | | | | | | | 50 | |
| | Polypropylene resin (A) | | | | | | | 15 | 30 | | |
| | Graft polymer (G) | G-1 | 38 | 38 | | | | 38 | 38 | 38 | 38 |
| | | G-2 | | | 19 | 19 | 19 | 47 | 32 | | 62 |
| | ABS resin | | | | | | 3 | | | | |
| | AS copolymer-2 | | 37 | 12 | 56 | 31 | | | | 12 | |
| | PC | | | | | | 53 | | | | |
| Polypropylene resin component content of thermoplastic resin composition (%) | | | 15 | 30 | 15 | 30 | 15 | 15 | 30 | 15 | 0 |
| Physical properties | Density (g/cm³) | | 1.02 | 0.99 | 1.03 | 1.01 | 1.07 | 1.02 | 0.99 | 1.02 | 1.05 |
| | Charpy impact strength (kJ/m²) | | 5.2 | 4.8 | 5.2 | 4.8 | 42 | 6 | 7.9 | 6 | 4.9 |
| | MVR (cm³/min) | | 90 | 138 | 101 | 145 | 38 | 65 | 70 | 65 | 63 |
| | Tensile strain at break (%) | | 16 | 12 | 16 | 12 | 64 | 3 | 6 | 3 | 6 |
| | Flexural modulus (MPa) | | 2030 | 1740 | 2130 | 1940 | 2100 | 2320 | 1980 | 2320 | 2750 |
| Appearance | L* | | 11.6 | 12 | 13.8 | 14.2 | 14.4 | 15.1 | 17.7 | 15.1 | 10.8 |
| | Surface Gloss (%) | | 95 | 95 | 94 | 94 | 93 | 93 | 84 | 93 | 96 |
| | Visual evaluation | Surface layer of molded article | no problem | no problem | no problem | no problem | no problem | blushing/ haze | blushing/ haze | no problem | no problem |
| | | Periphery of gate | no problem | no problem | no problem | no problem | no problem | peeled | peeled | no problem | no problem |
| Dielectric properties | Relative dielectric constant | Average | 2.49 | 2.42 | 2.54 | 2.42 | 2.55 | 2.56 | 2.42 | 2.53 | 2.60 |
| | | Minimum | 2.48 | 2.41 | 2.52 | 2.41 | 2.53 | 2.52 | 2.40 | 2.51 | 2.60 |
| | | Maximum | 2.51 | 2.42 | 2.55 | 2.42 | 2.57 | 2.60 | 2.50 | 2.59 | 2.61 |
| | Dielectric loss tangent (×10⁻³) | | 5.90 | 4.55 | 5.90 | 4.60 | 5.90 | 5.90 | 4.60 | 5.90 | 6.50 |

TABLE 3

| | | Example | | Comparative example | |
|---|---|---|---|---|---|
| | | II-1 | II-2 | II-1 | II-2 |
| Image analysis result | Total area ΣS (μm²) | 845.7 | 835.8 | 845.7 | 789.7 |
| | Total perimeter ΣL (μm) | 122.4 | 106.1 | 56.7 | 64.0 |
| | ΣL per 1 μm²/ΣS | 0.145 | 0.126 | 0.067 | 0.081 |

The following can be seen from Table 2.

In Examples II-1 to 5, appearance defects and peeling are not caused, and variations in millimeter-wave characteristics are small, and stable performance can be exhibited.

Regarding Comparative examples II-1 and II-2 in which the polypropylene resin (A) was incorporated in place of the polypropylene-based graft polymer (E-1), in Comparative example II-1 in which the polypropylene content was 15%, the millimeter-wave characteristics are provided on average but vary. In the millimeter-wave characteristics of Comparative Example II-2, the variations are small. In each of Comparative examples II-1 and II-2, the appearance is markedly poor, and the resin layer was easily peeled off by hand on the surface layer surface around the cut portion of the gate portion of the test specimen, so that peeling from the resin occurs, which is not practical.

In Comparative example II-3, since the polypropylene-based graft polymer (e-1) whose particle size cannot be identified due to solution polymerization is used, millimeter-wave characteristics are seemingly provided on average but vary.

In Comparative examples II-1 to 3, the millimeter-wave characteristics of Comparative example II-4, which does not contain the polypropylene-based graft polymer (E-1) or the polypropylene resin (A), are improved, but there are problems in terms of practicality and functionality due to poor appearance, peeling, and variations in millimeter-wave characteristics.

It can be seen from Table 3 that the use of the thermoplastic resin composition II of the present invention provides the molded article containing the polypropylene resin component finely dispersed and having excellent appearance.

INDUSTRIAL APPLICABILITY

The molded article I of the present invention produced by molding the thermoplastic resin composition I of the present invention containing the polypropylene-based graft polymer (E) of the present invention is excellent in impact resistance and appearance, and can provide high adhesion strength and good appearance even in two-color molding with a polypropylene-based resin. Accordingly, the molded article can be suitably used for, for example, vehicle interior and exterior components, building material components, such as wall materials and window frames, tableware, toys, home electric appliance components, such as vacuum cleaner housings, television housings, and air-conditioner housings, interior members, ship members, and communication device housings.

The molded article II of the present invention obtained by molding the thermoplastic resin composition II of the present invention is excellent in impact resistance and appearance, and can stably exhibit millimeter-wave characteristics. Thus, the molded article II of the present invention is suitable for millimeter-wave radar components, radomes for millimeter-wave radars, and millimeter-wave radars, which require such characteristics, and can also be used as a vehicle component. Moreover, the molded article II of the present invention can also be suitably used for ship members, communication devices, OA devices, mobile devices, toys, and home electric appliance components, such as vacuum cleaners, television sets, and air conditioners.

Although the present invention has been described in detail with reference to particular embodiments, it is apparent to a person skilled in the art that various modifications can be made therein without departing from the spirit and scope of the present invention.

The present application is based on Japanese Patent Application No. 2020-213849 filed on Dec. 23, 2020, Japanese Patent Application No. 2021-014482 filed on Feb. 1, 2021, and Japanese Patent Application No. 2021-171064 filed on Oct. 19, 2021, which are incorporated herein by reference in their entirety.

The invention claimed is:

1. A polypropylene-based graft polymer (E) prepared by graft polymerization of a vinyl monomer (D1) onto polypropylene-based resin particles (C) containing 100 parts by mass of a polypropylene resin (A) and 5 to 25 parts by mass of an acid-modified olefin resin (B) and having a volume-average particle size of 50 to 850 nm, wherein the polypropylene resin (A) contains 80% to 100% by mole of propylene units based on the total constitutional units of the polypropylene resin (A).

2. The polypropylene-based graft polymer (E) according to claim 1, wherein the polypropylene-based graft polymer (E) has a degree of grafting of 10% to 70% by mass.

3. The polypropylene-based graft polymer (E) according to claim 1, wherein of 100% by mass of the vinyl monomer (D1), 50% to 90% by mass is an aromatic vinyl compound, and 10% to 50% by mass is a vinyl cyanide compound.

4. The polypropylene-based graft polymer (E) according to claim 1, wherein the polypropylene-based graft polymer (E) is prepared by graft polymerization of 20% to 70% by mass of the vinyl monomer (D1) in the presence of 30% to 80% by mass of the polypropylene-based resin particles (C) (provided that the total of the polypropylene-based resin particles (C) and the vinyl monomer (D1) is 100% by mass).

5. The polypropylene-based graft polymer (E) according to claim 1, wherein the polypropylene-based resin particles (C) are prepared by melt-kneading the polypropylene resin (A) and the acid-modified olefin resin (B) and dispersing a resultant kneaded product in an aqueous medium.

6. A thermoplastic resin composition, comprising the polypropylene-based graft polymer (E) according to claim 1.

7. The thermoplastic resin composition according to claim 6, wherein the amount of the polypropylene-based graft polymer (E) contained is 3% to 70% by mass based on 100% by mass of all resin components contained in the thermoplastic resin composition.

8. A thermoplastic resin composition, comprising: 1 to 80 parts by mass of the polypropylene-based graft polymer (E) according to claim 1; and 20 to 99 parts by mass of a graft polymer (G) prepared by graft polymerization of a vinyl monomer (D2) onto an ethylene-α-olefin rubber polymer (F) having an ethylene unit content of 50% to 95% by mass (provided that a total of the polypropylene-based graft polymer (E) and the graft polymer (G) is 100 parts by mass).

9. The thermoplastic resin composition according to claim 8, wherein of 100% by mass of the vinyl monomer (D2), 50% to 90% by mass is an aromatic vinyl compound, and 10% to 50% by mass is a vinyl cyanide compound.

10. The thermoplastic resin composition according to claim 8, wherein the graft polymer (G) is a rubbery polymer-reinforced vinyl resin having a grafted polymer portion and a vinyl resin portion, the grafted polymer portion being derived from the ethylene-$\alpha$-olefin rubber polymer (F) and the vinyl monomer (D2), the grafted polymer portion is contained in an amount of 10% to 90% by mass, and the vinyl resin portion is contained in an amount of 90% to 10% by mass, based on 100% by mass of a total of the grafted polymer portion and the vinyl resin portion, and a degree of grafting is 20% to 65%.

11. A molded article obtained by molding the thermoplastic resin composition according to claim 6.

12. A millimeter-wave radome, comprising the molded article according to claim 11.

13. A millimeter-wave radar, comprising the millimeter-wave radome according to claim 12.

14. A two-color molded article obtained by two-color molding of the thermoplastic resin composition according to claim 6 and a polypropylene-based resin.

\* \* \* \* \*